INVENTORS
CEBERN B. TRIMBLE,
FRANK S. C. MO &
OLLAH COMBS
BY Louis A. Kline
Albert L. Sessler, Jr.
THEIR ATTORNEYS INVENTORS
CEBERN B. TRIMBLE,
FRANK S. C. MO &
OLLAH COMBS
BY Louis A Kline
Albert L. Sessler, Jr.
THEIR ATTORNEYS

INVENTORS
CEBERN B. TRIMBLE,
FRANK S. C. MO &
OLLAH COMBS

BY Louis A Kline
Albert L. Sessler, Jr.
THEIR ATTORNEYS

INVENTORS
CEBERN B. TRIMBLE,
FRANK S. C. MO &
OLLAH COMBS

BY Louis A. Kline
Albert L. Sessler, Jr.
THEIR ATTORNEYS

Nov. 11, 1969 C. B. TRIMBLE ET AL 3,478,341

RANDOM ACCESS MAGNETIC DISC STORAGE DEVICE WITH PERIPHERAL BEARING MEANS

Filed July 11, 1966 8 Sheets-Sheet 5

INVENTORS
CEBERN B. TRIMBLE,
FRANK S. C. MO &
OLLAH COMBS

BY Louis A. Kline
Albert L. Sessler, Jr.
THEIR ATTORNEYS

INVENTORS
CEBERN B. TRIMBLE,
FRANK S. C. MO &
OLLAH COMBS
BY Louis A. Kline
Albert L. Sessler, Jr.
THEIR ATTORNEYS

INVENTORS
CEBERN B. TRIMBLE,
FRANK S. C. MO &
OLLAH COMBS

BY Louis A. Kline
Albert L. Sessler, Jr.
THEIR ATTORNEYS

INVENTORS
CEBERN B. TRIMBLE,
FRANK S. C. MO &
OLLAH COMBS

BY Louis A. Kline
Albert L. Sessler, Jr.
THEIR ATTORNEYS

United States Patent Office 3,478,341

Patented Nov. 11, 1969

3,478,341

RANDOM ACCESS MAGNETIC DISC STORAGE DEVICE WITH PERIPHERAL BEARING MEANS

Cebern B. Trimble, Centerville, Frank S. C. Mo, Kettering, and Ollah Combs, Morrow, Ohio, assignors to The National Cash Register Company, Dayton, Ohio, a corporation of Maryland Filed July 11, 1966, Ser. No. 564,334
Int. Cl. G11b 5/82
U.S. Cl. 340—174.1 17 Claims

ABSTRACT OF THE DISCLOSURE

A random access high-density information storage device employing an interchangeable rotatable disc cooperating with a plurality of reading and recording elements. The disc is driven by flexible means to permit its precise positioning by a plurality of frames on which are mounted arcuate members arranged to engage the periphery of the disc. Certain of these frames are rigid to provide reference locations, while the remaining frames are flexible so that their arcuate members urge the disc into the proper position as determined by the arcuate members associated with the rigid frames. Indexing means are mounted on the frames so that the associated reading and recording head units may be set to perform reading or recording operations on a predetermined track on the disc, and may be shifted from one track to another. Air bearings are employed to minimize friction.

This invention relates generally to the storage of information, and more specifically relates to an information storage device of the random access type, employing an interchangeable rotatable storage disc cooperating with a plurality of reading and recording elements for high-density information storage.

High storage density has become increasingly important in many applications of information storage devices, for reasons of both access speed and economy. Also, interchangeability of storage media has become essential, due to the large "file size" requirements of many customers for information-processing systems.

A major problem in the design of high-density storage devices embodying interchangeable storage elements has been the difficulty of securing the precise and accurate alignment or registration required for proper reading and recording when a storage element is used in association with two or more different reading and recording head units. This problem obviously becomes more and more critical as recording density is increased.

In the present invention, novel positioning and indexing means are provided for precisely positioning the storage disc and the reading and recording head units with respect to each other, together with novel means for supporting and driving the storage disc, in order to overcome the problem referred to above, and to provide a practical, effective high-density information storage device utilizing interchangeable information storage elements.

Briefly, the storage device of the present invention includes a disc having, on at least one side thereof, an information storage area. The disc is supported for rotation by air bearing means and is driven by a flexible coupling, thus providing a certain degree of freedom in its movement, to permit it to be positioned precisely by appropriate means during reading and recording operations. These positioning means comprise a plurality of frames on which are mounted arcuate members arranged to engage the periphery of the storage disc. Certain of these frames are of rigid construction, so that their associated arcuate members can provide reference locations to enable the storage disc to be precisely positioned during its rotation, while the remaining frames are of a flexible construction, so that their associated arcuate members are urged into engagement with the edge of the storage disc to urge the disc into the proper position as determined by the arcuate members associated with the rigid frames. Said frames also have mounted thereon indexing means by which the associated reading and recording head units may be set to perform reading or recording operations with a predetermined track on the storage disc, and may also be shifted from one track to another. Actual physical contact between the arcuate surfaces and the periphery of the disc is prevented by air under pressure which is expelled from orifices in said surfaces.

It is accordingly an object of the present invention to provide an effective high-density information storage device which includes an interchangeable storage element.

Another object is to provide an information storage device having positioning means to enable accurate reading and recording of high-density information on interchangeable storage elements.

A further object is to provide an information storage device including a storage disc element supported by air bearing means to enable its precise positioning with respect to reading and recording heads for information storage and retrieval operations.

An additional object is to provide an information storage device including a disc mounted for rotational movement and at least one head-supporting unit including a sensing head and positioning means adapted to cooperate with the periphery of the disc for precise positioning of said sensing head.

Another object is to provide an information storage device including a storage disc mounted for rotational movement and at least one head-supporting unit including a reading and recording head, positioning means adapted to cooperate with the storage disc for precise positioning of said head to enable reading and recording to take place, and an indexing device for indexing the head for reading and recording on any one of a plurality of tracks on said storage disc.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIG. 1 is a partial plan view of the information storage device, showing the storage disc in phantom lines, the air bearing means for supporting the storage disc, four frames to which are secured arcuate members for retaining the storage disc in proper position, and four reading and recording head units secured to the frames, and positioned to read and record on different areas of the storage disc.

Figures 13, 14:
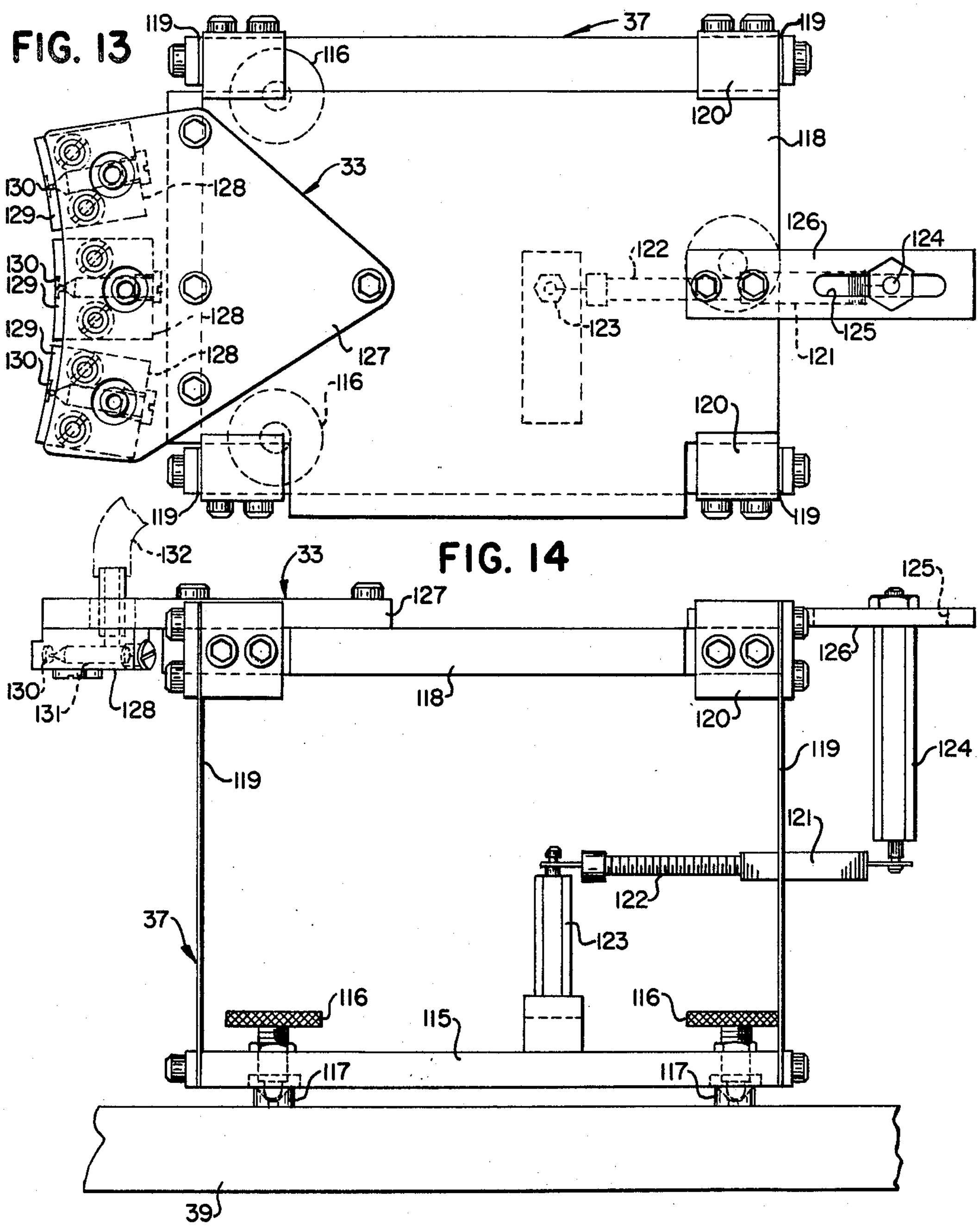
Figure 15:
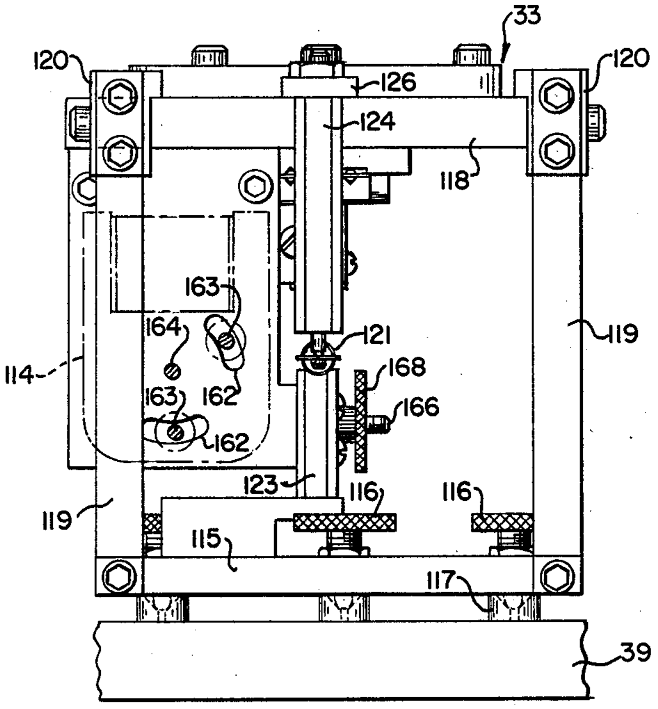

FIGS. 13, 14, and 15 are plan, elevation, and end views, respectively, of one of the flexible frames, particularly showing the adjusting means by which the degree of resilience in the frame can be altered.

Figure 16:
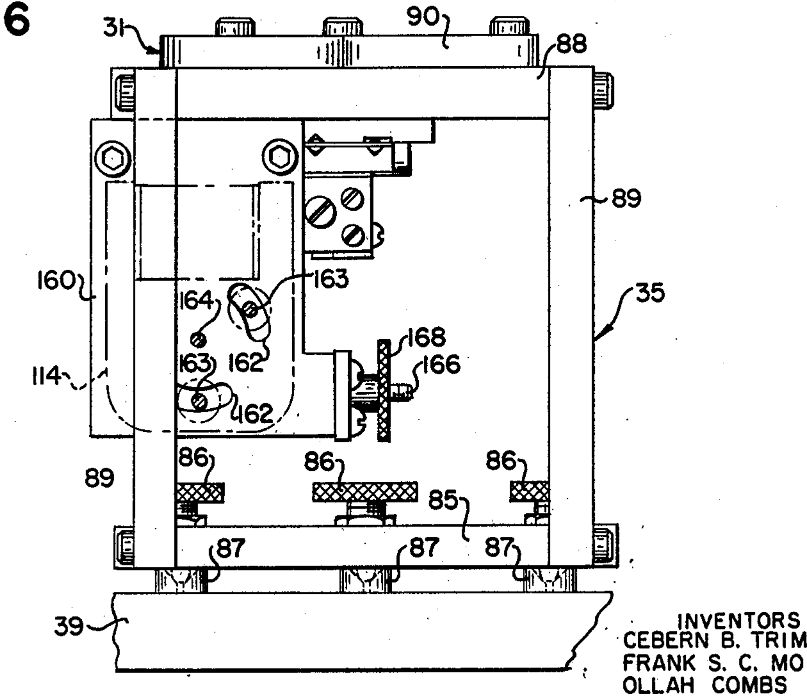

FIG. 16 is an end view of one of the rigid frames, with the stepping motor shown only in phantom lines, and particularly showing the mounting plate for the stepping motor, and the means by which the position of the motor may be adjusted.

Figures 17, 18, 19, 20, 21, 22, 23, 24:
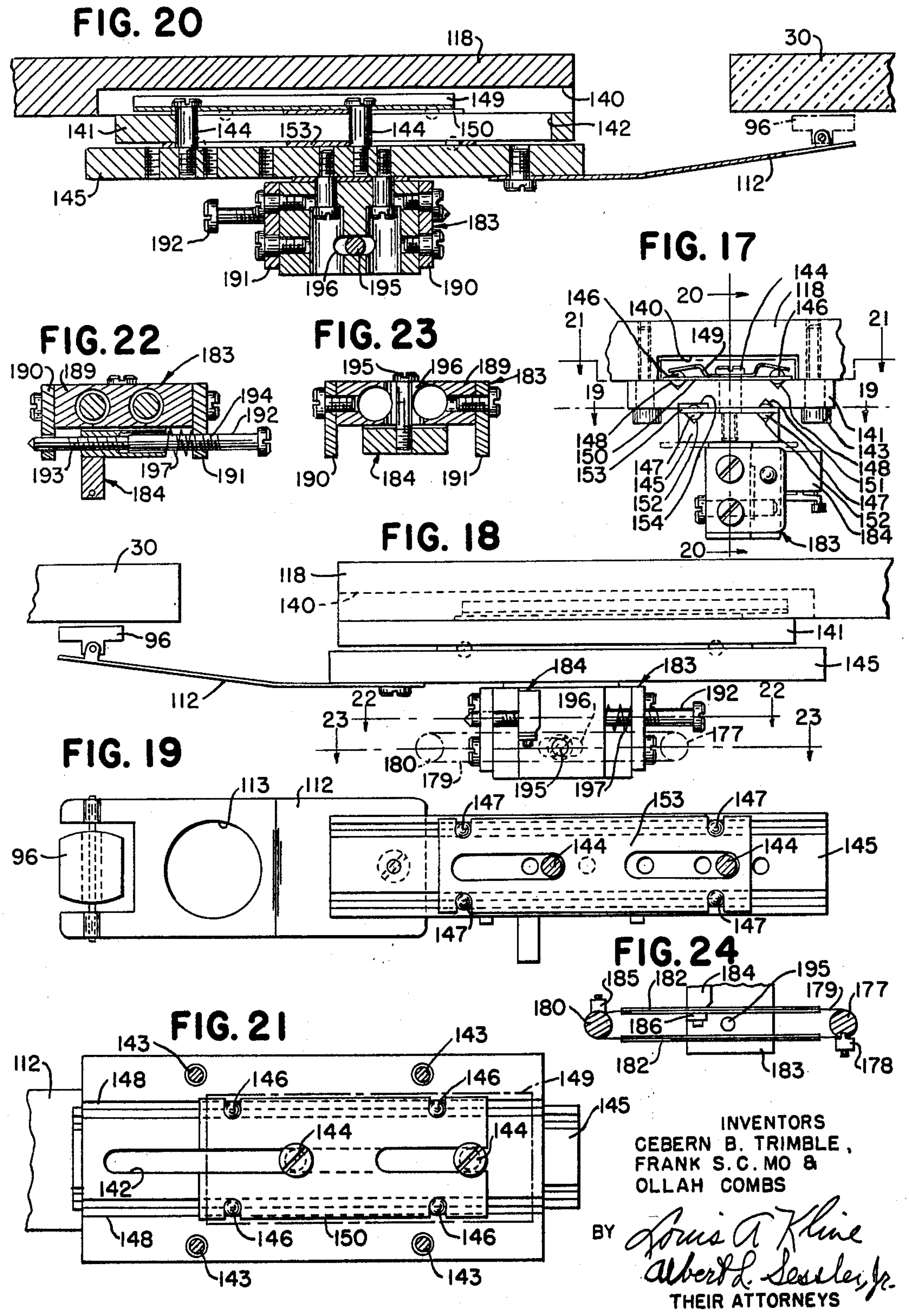

FIG. 17 is a detail end view showing the support for the reading and recording head unit of one of the frames, and the manner in which said support is slidably mounted on the frame.

FIG. 18 is a detail elevation view showing a reading and recording head unit, and also showing the manner in which it is mounted on one of the frames.

FIG. 19 is a sectional view taken on line 19—19 of FIG. 17, showing one of the reading and recording head units, and the slidable means by which it is mounted on one of the frames.

FIG. 20 is a sectional view taken on line 20—20 of FIG. 17.

FIG. 21 is a sectional view taken on line 21—21 of FIG. 17.

FIG. 22 is a sectional view taken on line 22—22 of FIG. 18.

FIG. 23 is a sectional view taken on line 23—23 of FIG. 18.

FIG. 24 is a fragmentary detail view showing a portion of the driving means by which indexing movement is transmitted to the reading and recording head unit.

Figures 1, 2:
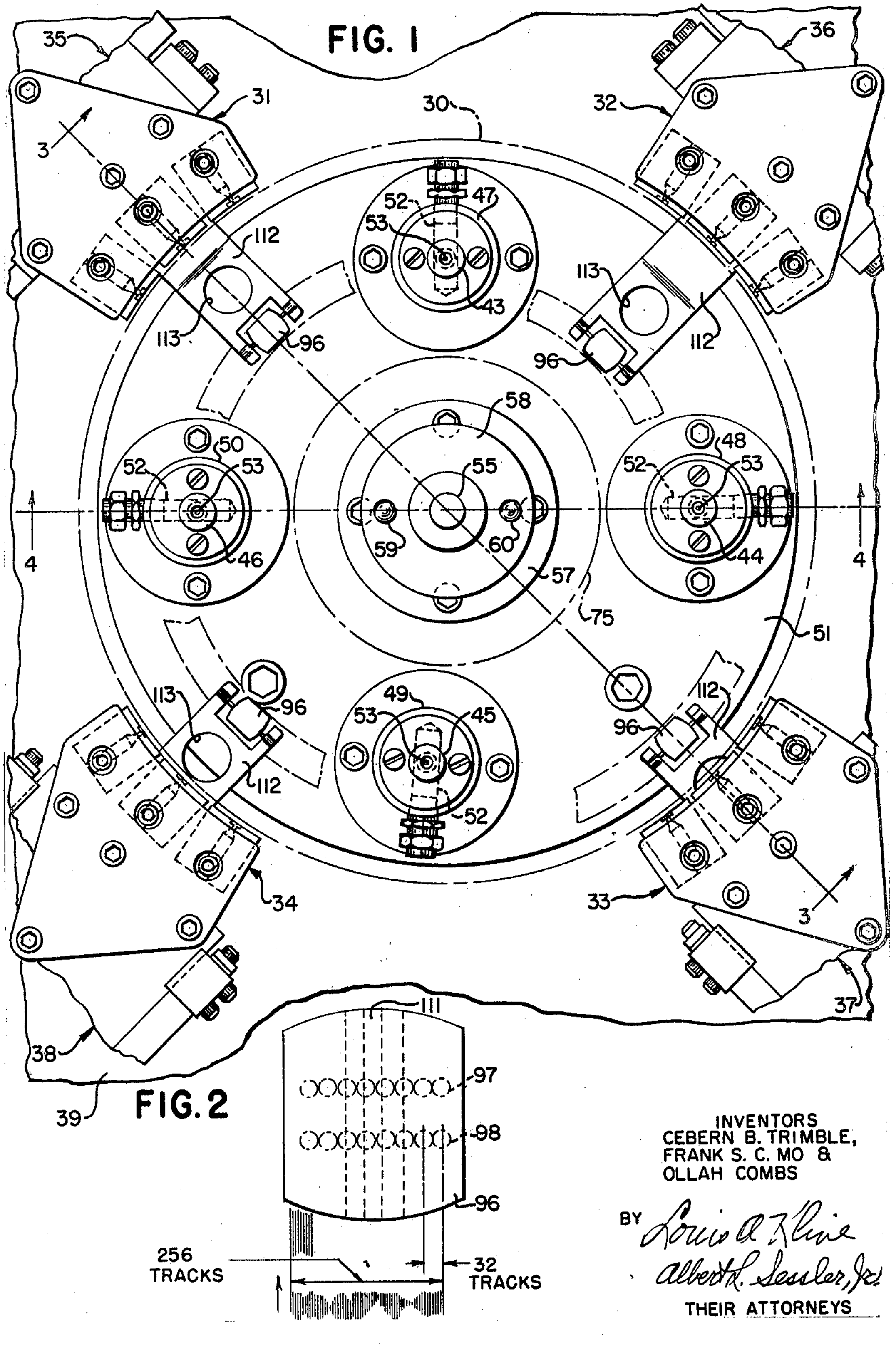
FIG. 2 is an enlarged view of a magnetic reading and recording multiple-heat unit, in which the individual reading and recording heads are represented by small circles.

Referring now to FIG. 1, in the preferred embodiment of the present invention, a storage disc 30 (shown in phantom lines) is positioned in centered relationship with respect to four arcuate members 31, 32, 33, and 34, each of which is secured to a frame 35, 36, 37, and 38, respectively. In the preferred embodiment, the disc 30 is coated on its underside with a thin layer of magnetic material for the storage of information, but other suitable types of storage media could be used instead, if desired. Also, information could be stored on the upper surface of the disc 30 instead of, or in addition to, the lower surface, if desired, by suitable redesign of the reading and recording head units, and their operating means. The frames 35 and 36 are of a rigid construction, while the frames 37 and 38 are of a flexible construction, as will subsequently be described in detail, so as to be capable of radial movement with respect to the storage disc 30. All of said frames are secured to a base member 39.

The storage disc 30, when operating, is floatingly supported by an air cushion which extends between it and each of four pads 43, 44, 45, and 46, located at the top of four cylindrical columns 47, 48, 49, and 50 (FIGS. 1 and 4) secured to a circular member 51, which is in turn fixed to the base member 39. The air cushion is provided by air under pressure which is introduced from an air hose 42 into a passage 52 in each of the columns. An orifice 53 in each of the pads is connected to said passage, and the air under pressure is expelled therethrough to provide a cushion which suspends the disc 30 above the columns 47, 48, 49, and 50.

Figure 3:
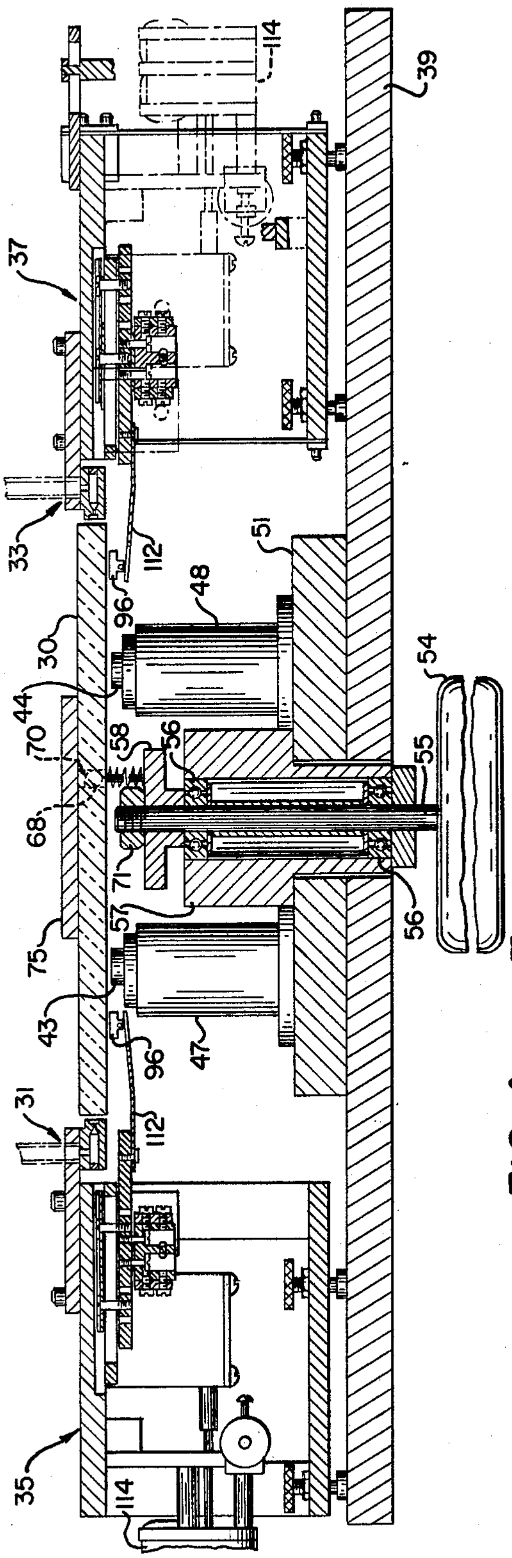
FIG. 3 is a sectional view of the information storage device, taken on line 3—3 of FIG. 1, and particularly showing the storage disc, the frames, and the reading and recording heads mounted thereon and cooperating with an information storage area on the underside of the storage disc.

Driving of the storage disc 30 in rotational movement is accomplished by a motor 54 (FIGS. 3 and 4) of suitable design, having a shaft 55 mounted in central bearings 56 in a column 57, which extends through the members 39 and 51. A circular member 58 is secured to the upper portion of the shaft 55 by suitable means, such as a nut 71, and is provided with two apertures 59, 60, into which are tightly fitted two rods 61 and 62. Maintained in alignment with said rods by coil springs 63, 64 are two additional rods 65, 66 having spherical elements 67, 68 at their upper ends. The elements 67, 68 fit into bores 69, 70 in the memory disc 30, so that the rods 61, 62, the springs 63, 64, and the rods 65, 66 form a flexible coupling means between the shaft 55 and the disc 30, enabling the motor 54 to drive said disc in rotational movement.

It is desirable to provide some means in the preferred embodiment of the invention to maintain the storage disc 30 in its proper position vertically against forces acting upwardly thereon, such as the force of the air flow from the orifices 53 and the upward forces which may be exerted by the reading and recording head units on the disc 30 as it rotates. To this end, a circular element 75, of suitable weight, is placed atop the disc 30. Small projections 76 may conveniently fit within the bores 67, 70 to maintain the element 75 in centered relation on the disc 30. If desired, other retaining means could be used in place of the element 75, such as a spring retaining member of suitable configuration.

Figure 4:
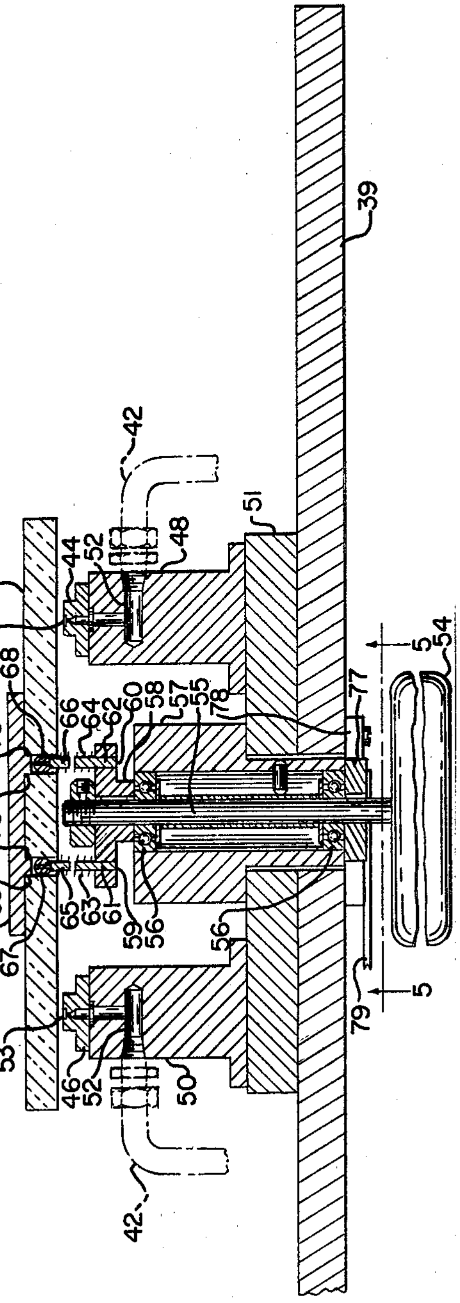
FIG. 4 is a view of the information storage device, taken on line 4—4 of FIG. 1, and particularly showing the air bearing means by which the storage disc is supported, and the driving means by which the storage disc is driven.
Figure 5:
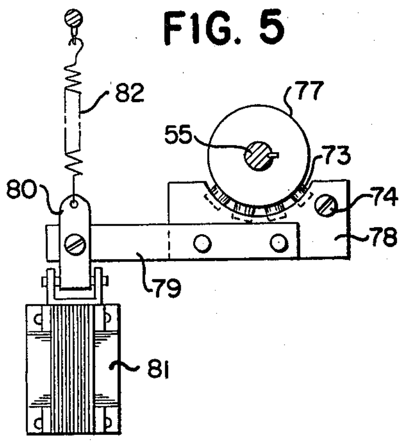
FIG. 5 is a sectional view taken on line 5—5 of FIG. 4, and showing the braking means by which movement of the storage disc is halted.

Braking means are provided to halt rotational movement of the disc 30 on command. As best shown in FIGS. 4 and 5, a disc 77 is keyed to the lower end of the shaft 55. Cooperating with said disc 77 is a brake shoe 78 pivotally mounted by a stud 74 on the base member 39. The shoe 78, having individual friction elements 73, is connected by an arm 79 and a bracket 80 to a solenoid 81 and is urged into an engaged position by a spring 82. The shoe 78 may be shifted from the engaged position, in which it is shown in FIG. 5, to a disengaged position by energization of the solenoid 81, against the force of the spring 82. It will thus be seen that the solenoid 81 must be energized during rotation of the storage disc 30, and that when said solenoid is deenergized, the brake is at once applied to halt rotational movement of the disc 30, under the influence of the spring 82.

As has been previously mentioned, the four frames 35, 36, 37, and 38 are located on the base member 39 around the periphery of the storage disc 30 at ninety-degree intervals, so that their associated arcuate members 31, 32, 33, and 34 are in closely-adjacent relationship to the edge of the disc 30.

Figure 7:
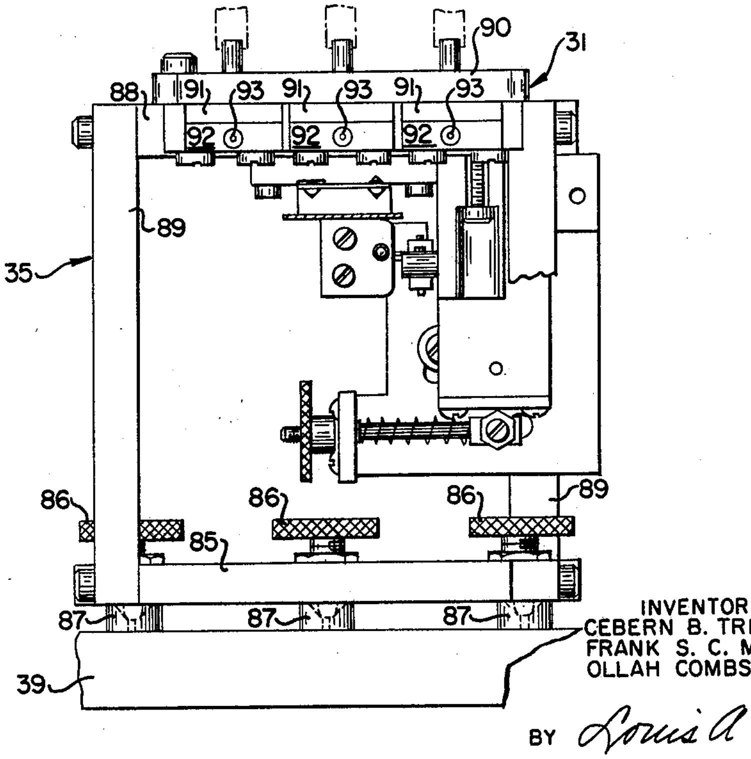
FIG. 7 is an end view of one of the rigid frames and its associated arcuate member, particularly showing the orifices which are located in the arcuate surface and through which air is expelled to maintain separation between the disc and the arcuate member.

Each of the rigid frames 35 and 36 includes a lower plate 85 (FIGS. 7, 9, and 16) having means thereon for engagement with the base member 39. Such engaging means could take any suitable form, and in the illustrated embodiment, a plurality of screws 86 are shown extending downwardly through the plate and into sockets 87 fixed to the base member 39. An upper plate 88 is rigidly secured with respect to the lower plate 85 by four legs 89, which extend between the two plates and are fixed thereto.

Secured to the upper surface of the upper plate 88 of the rigid frames 35 and 36 are the arcuate members 31 and 32. Each of said arcuate members includes an element 90 having an arcuate edge facing the disc 30 and a plurality of blocks 91 fixed to the lower surface of said element. Each block is provided with an arcuate face 92, which extends outwardly from the arcuate edge of the element 90, and which includes an orifice 93 connected by an interior air passage 94 in the block 91 and the element 90 to an air hose 95 through suitable connections. Air introduced under pressure from the hoses 95 is expelled from the orifices 93 to create an air bearing zone which prevents actual physical contact between the arcuate faces of the blocks 91 and the storage disc 30, but which permits the disc 30 to rotate in close proximity to the arcuate faces, thus limiting its movement during rotation, for accurate positioning.

The rigid frames 35 and 36 also provide mounting platforms for two of the reading and recording head assemblies which cooperate with the coating of magnetic material on the lower face of the storage disc 30 for the storage and retrieval of information. In the illustrated embodiment, as best seen in the enlarged view of FIG. 2, each reading and recording head unit 96 includes eight aligned pairs of individual reading heads 97 and individual recording heads 98. Of course, it will be realized that this is only one possible arrangement, and that other arrangements could be utilized if desired, such as employing the heads 97 as combined read-write heads, thus making the heads 98 available for use as erase heads. In the present arrangement, the head unit shown in FIG. 2 is capable of reading and recording in any one of 256 circular tracks on the disc 30 by means of selective indexing of the head unit containing the eight individual pairs of heads to any one of thirty-two possible positions, by apparatus subsequently to be described, and by selection of one of the eight pairs of reading and recording heads for operation.

Figure 6:
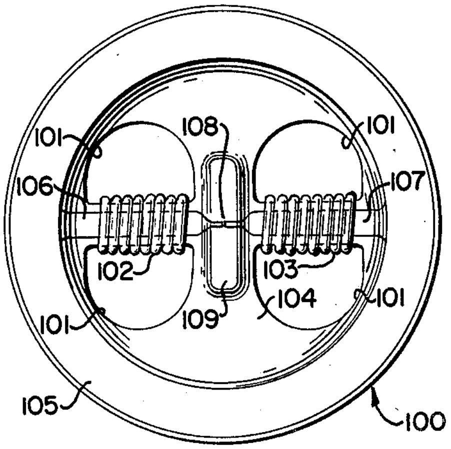
FIG. 6 is a greatly enlarged view of a single individual reading or recording head.

One suitable configuration for the individual heads 97 and 98 is shown in the greatly enlarged view of FIG. 6. The head 100 shown there is of circular shape, with a button-like appearance, due to the four apertures 101 therein, which are provided to enable two coils 102 and 103 of the head to be wound. The head is formed by depositing or plating, on a non-magnetic substrate 104, a magnetic layer having an annular portion 105 with two straight portions 106 and 107 extending inwardly therefrom. An inner gap 108 is provided between the two portions 106 and 107, and is located on a raised area 109 of the non-magnetic substrate. The coils 102 and 103 are wound around the portions 106 and 107, respectively, to complete the head, which functions in a conventional manner, despite its diminutive size. For other examples of magnetic heads which may be employed in the present invention, as well as the processes for fabricating them, reference may be had to the co-pending United States patent application Ser. No. 511,834, filed Dec. 6, 1965, now Patent No. 3,377,925, inventors Cebern B. Trimble and Robert R. Skutt, assigned to the present assignee.

Figures 8, 9:
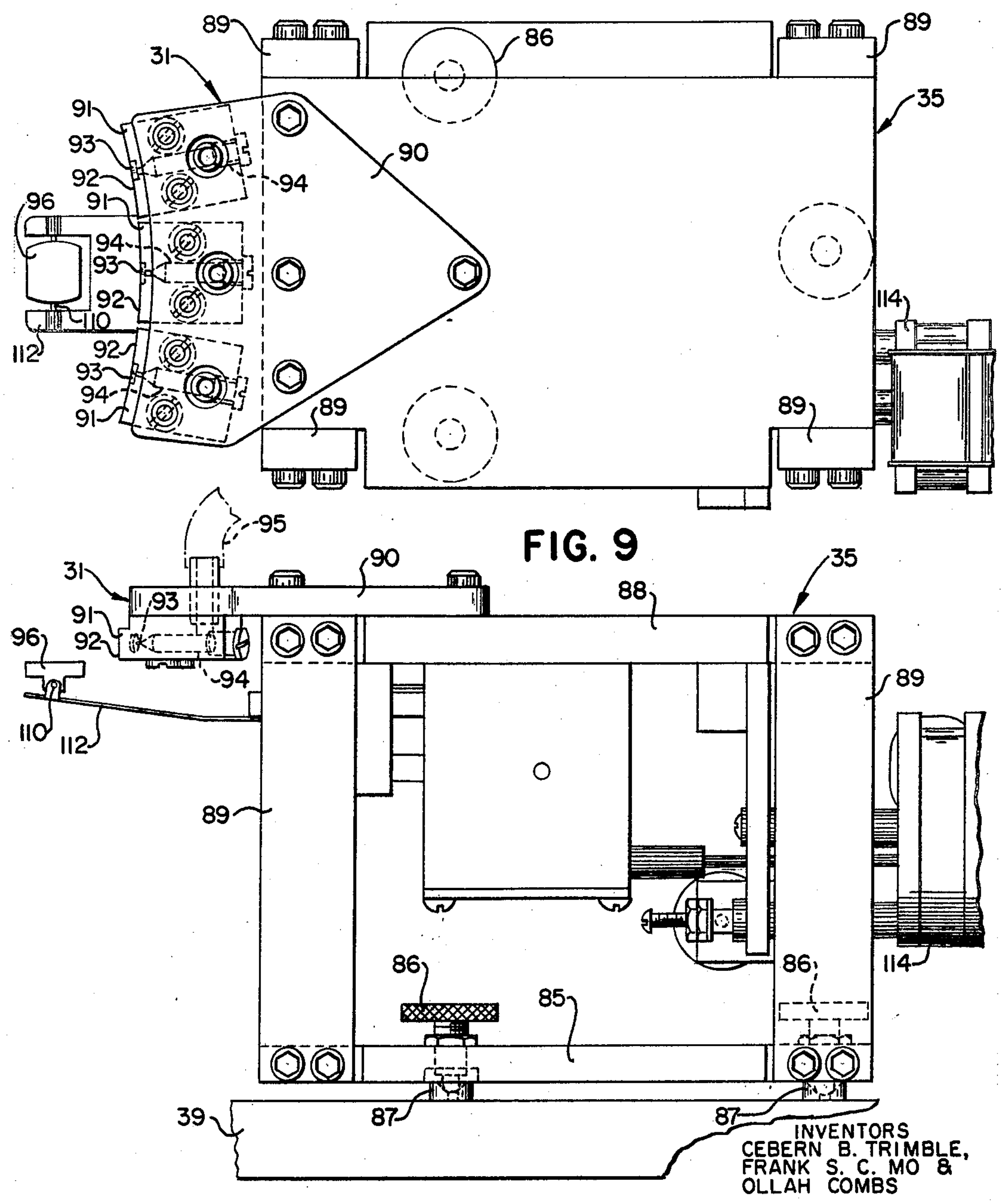
FIG. 8 is a plan view of one of the fixed frames.
FIG. 9 is an elevation view of one of the fixed frames.

As shown in FIGS. 1, 2, and 9, the head unit 96 is pivotally mounted, by means of a pin 110 cooperating with a bore 111 in said head unit, between two legs of a resilient arm 112, which is in turn slidably mounted, as will subsequently be described in greater detail, for in-and-out indexing movement, on the upper plate 88 of the fixed frames 35 and 36, and which urges the head unit 96 toward engagement with the underside of the storage disc 30. An aperture 113 is formed in the arm 112 to increase its flexibility to permit the head unit 96 to coact in the most efficient manner with the underside of the storage disc 30. The head unit 96 is formed in cross section in an air foil configuration, so that it actually flies in the air stream generated by rotation of the disc 30 and thus maintains an appropriate distance from said disc for reading and recording operations. As will also be subsequently described in greater detail, the indexing of the head unit 96 is under the control of a stepping motor 114, which acts through a gear train to shift the arm 112 inwardly or outwardly in a radial direction to position the head unit precisely with respect to the particular track on the disc 30 for which reading or recording is desired.

Figures 10, 11:
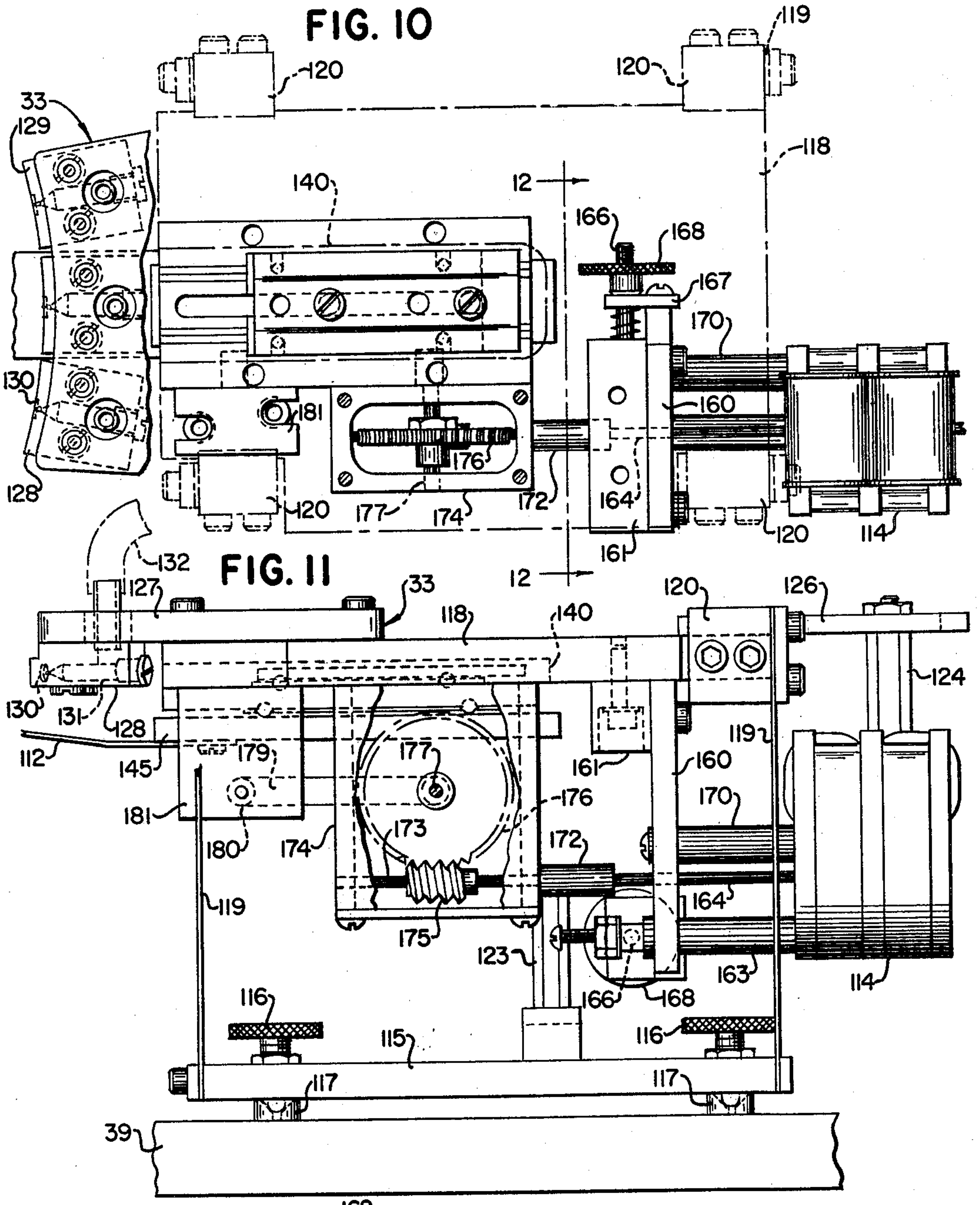
FIG. 10 is a plan view of one of the flexible frames, in which the top plate has been removed and is shown only in phantom lines, so that the indexing means for the reading and recording head unit can more clearly be shown.
FIG. 11 is an elevation view of one of the flexible frames.
Figure 12:
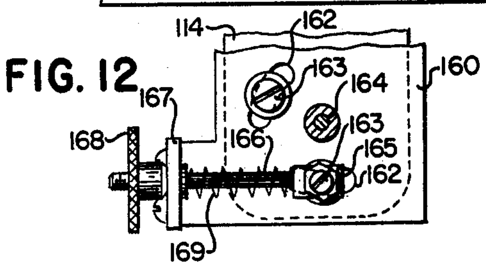
FIG. 12 is a sectional view taken on line 12—12 of FIG. 10, showing the means for adjustably mounting the stepping motor by which the reading and recording head unit is indexed.

Each of the flexible frames 37 and 38 includes a lower plate 115 (FIGS. 11, 14, and 15) having thereon means for engagement with the base member 39. Such engaging means could take any suitable form, and, in the illustrated embodiment, a plurality of screws 116 are shown extending downwardly through the plate 115 and into sockets 117 fixed to the base member 39. An upper plate 118 is flexibly connected to the lower plate 115 by means of four spring-like legs 119, which extend between the two plates and are fixed directly to the lower plate 115, and by means of mounting brackets 120 to the upper plate 118.

As best shown in FIGS. 13, 14, and 15, a constant tension is applied to the upper plate 118 to urge it in the direction of the storage disc 30 by means of a spring 121, which is connected at one end by means of an adjustable threaded member 122 to a post 123 anchored to the lower plate 115, and which is connected at its other end to a post 124 adjustably secured in a slot 125 in a bracket 126 secured to the upper plate 118. The tension of the spring 121 may be adjusted by shifting the position of the post 124 in the slot 125 of the bracket 126. Also, by rotating the threaded member 122 with respect to the spring 121 to alter the effective number of coils in said spring, the spring constant of the spring 122 is altered. This permits tuning of the resonant frequency of the frame 37, taken as a whole, to the most favorable frequency for optimum operation of the system.

The previously-mentioned arcuate members 33 and 34 are secured to the upper surface of the upper plate 118 of the flexible frames 37 and 38. These arcuate members are identical to the previously-described arcuate members 31, 32 associated with the rigid frames 35, 36 and includes an arcuate element 127 and a plurality of blocks 128, each having an arcuate face 129, in which is positioned an orifice 130, to which air under pressure is introduced through a passage 131 from an air hose 132 to provide an air bearing between the arcuate faces 129 of the blocks 128 and the edge of the storage disc 30.

Also mounted on the flexible frames 37 and 38 are two of the reading and recording head assemblies which cooperate with the coating of magnetic material on the lower face of the storage disc 30 for the storage and retrieval of information. As already described in connection with the frames 35 and 36, on each of the frames 37 and 38, a reading and recording head unit 96, having a total of eight pairs of individual heads 97, 98, is pivotally mounted between two legs of a resilient arm 112, which is, in turn, slidingly mounted for in-and-out indexing movement on the upper plate 118 of the flexible frames 37 and 38.

The details of the slidable mounting of the arm 112 with respect to the upper plate of each frame 35, 36, 37, and 38 are best shown in FIGS. 17 to 21 inclusive. The assembly shown in these figures includes the upper plate 118 of one of the frames 37 and 38, but exactly the same structure is employed in associated with the frames 35 and 36.

It will be seen from the drawings that a channel 140 is formed in the underside of the upper plate 118, and that a guide 141 having a central slot 142 along its length is secured to the underside of the upper plate 118 below the channel 140 by suitable fastening means, such as the screw 143. A pair of studs 144 extend through the slot 142 and are secured to a slide 145, to one end of which is fastened the flexible arm 112, on which the head unit 96 is pivoted. Bearing means are provided to facilitate the sliding movement of the studs 144 in the slot 142, and include an upper plurality of ball bearings 146 and a lower plurality of ball bearings 147. The upper ball bearings 146 ride in grooves 148 in the guide 141 and are held in the proper position by first and second retaining members 149 and 150, which, in turn, are prevented from undesired movement by the heads of the studs 144. The lower ball bearings 147 ride in grooves 151 and 154 in the guide 141, and in grooves 152 in the slide 145, and maintained in proper position with respect to each other by being positioned in cut-outs in a retainer 153 located between the guide 141 and the slide 145. It may be noted that the groove 154 is of rectangular cross section, in order to provide a slight degree of "play" in aligning the upper and lower grooves in which the lower ball bearings 147 ride.

The head unit 96 is indexed inwardly and outwardly with respect to the storage disc 30 by operation of the electric stepping motor 114 under recording track selection controls, which may be of any suitable type. It will be realized that the same motor-driven indexing means are employed on all of the frames 35, 36, 37, and 38, but only one such means will be described in detail.

As may best be seen in FIGS. 10, 11, 12, and 15, the motor 114 is adjustably mounted on a bracket 160, secured to a block 161, which in turn is secured to the upper plate 118. The bracket 160 extends downwardly from the upper plate 118 of the frames 37 and 38, and is provided with two arcuate mounting slots 162, which cooperate with two motor mounting bolts 163, on which are placed spacers 170 between the motor 114 and the bracket 160. This mounting permits the motor 114 to be rotated slightly to provide a very precise rotational positioning of its shaft 164. To aid in this adjustment, a collar 165 is located on one of the mounting bolts 163 and is fixed to one end of an adjusting rod 166, mounted at its other end in a support 167 fixed to the bracket 160.

The end of the rod 166 is threaded to receive a nut 168 for securing it in a desired position, and a spring 169, located on said rod between the support 167 and the collar 165, maintains a desired tension.

Coupled to the end of the motor shaft 164 (FIGS. 10 and 11) by a coupling 172 is a second shaft 173 journaled in the sides of a gear box 174. A worm 175 on the shaft 173 engages a worm wheel 176 on a shaft 177, which is also journaled in the gear box 174. One end of the shaft 177 extends outside of the gear box 174 and is fixed by a suitable clip 178 to an endless belt 179 (FIG. 24), which also extends around an idler 180, to which it is attached by a second clip 185. The idler 180 is mounted in a block 181 secured to the underside of the upper plate 118. Rotation of the shaft 177 through a maximum of one half of a full revolution is thus effective to shift the position of the belt 179 a corresponding amount.

Fixed to the upper and lower portions of the belt 179 are two reinforcing sheaths 182. A block assembly 183, which is fixed to the underside of the slide 145, has an extension 184, which is fixed to the belt 179 by a clip 186, so that movement of said belt causes a corresponding movement of the slide 145, to shift said arm 112 and its associated reading and recording head unit 96 inwardly or outwardly, as the case may be.

Means which may best be seen in FIGS. 17, 18, 20, 22, and 23 are provided for making fine positional adjustments of the extension 184 with respect to the block 183 for precise positioning of the head unit 96 in relation to reading and recording tracks on the storage disc 30. A central member 189 of the block 183 has two end pieces 190 and 191 secured thereto. An adjusting bolt 192, having first and second sections 193 and 294 threaded in the same direction but with slightly different pitches, engages a bore in the end piece 191 with the threaded section 194, while its free end rides in an unthreaded bore in the other end piece 190. The other threaded section 193 of the bolt 192 has a slightly finer pitch than the threaded section 194 and engages a threaded bore in the extension 184, which is fixed to the belt 179. It should be noted that the diameter of the threaded section 193 is slightly smaller than the diameter of the threaded section 194 to permit it to pass through the threaded bore in the end piece 191 during assembly.

The extension 184 is slidably attached to the central member 189 by suitable means, such as a bolt 195 fixed in the extension and cooperating with a slot 196 in the central member 183. The face of the extension 184 which engages the member 183 is partially cut away to reduce sliding friction. A spring 197 is positioned around the bolt 192 between the extension 184 and the end piece 191 for tensioning purposes.

Since the pitch of the threads of the two threaded sections 193 and 194 (and their cooperating bores) is slightly different, it will be seen that rotation of the bolt 190 through one full turn changes the position of the extension 184 with respect to the block 183 a distance equal to the difference in pitch between the two threaded sections 193 and 194 of the bolt 192. A fine adjustment of the setting of the head unit 196 may thus be obtained by this means. However, it should be recognized that the most precise adjustment of the head position is obtained by rotation of the shaft 164 of the motor 114 on its mounting bracket 160 by means of the nut 168 on the rod 166, as previously described. Any adjustment by this means is reduced through the gear train and belt drive to provide an extremely minute movement of the head unit.

The mode of operation of the illustrated embodiment of the present invention will now be described.

Since high-density storage of information, and its retrieval, require extremely precise positioning of the reading and recording head units with respect to the magnetic storage area of the disc, all necessary positioning adjustments of the various head units are completed before the first information storage operation is commenced. The various adjusting means previously described can be employed, either singly or in combination, to set the head units as desired. Once this has been done, all subsequent movements of the head units is under control of the stepping motors 114, which shift their respective head units radially in or out a distance equal to the precise distance between adjacent recording tracks for each step of the motor.

As has been previously described, and as is shown in FIG. 1, there are four reading and recording head units employed in the illustrated embodiments of the present invention, each associated with one of the frames 35, 36, 37, and 38. Therefore the magnetic coated area of the disc 30 is divided into four concentric annular recording areas of equal width measured along a radius of the disc, and one of the reading and recording head units 96 is assigned to each individual recording area. The arms 112 with which the units 96 are associated are made in different lengths in order to locate each head unit 96 properly with respect to its assigned recording area.

Let it then be assumed that the indexing means for each head unit 96 has been adjusted so that the individual heads of the various units are properly positioned with respect to the recording tracks in their assigned recording areas. In putting the random access information storage device of the present invention into operation, air under pressure is first applied from a suitable source to the various air hoses of the device, such as the hoses 42 and 95, so that the air bearing means between the pads 44 and the lower surface of the disc 30, and between the arcuate faces 92 of the blocks 91 and the peripheral edge of the disc 30, are rendered effective.

The disc 30 is thereby maintained suspended in the air a slight distance above the pads 44, with its peripheral edge spaced a slight distance away from the arcuate members 31, 32, 33, and 34 on the frames 35, 36, 37, and 38. Since the frames 35 and 36 are rigidly fixed to the base member 39 the arcuate members secured thereto furnish reference surfaces which limit the movement of the disc 30 laterally in the direction of said frames, in which direction said disc is urged by the resilient mounting of the frames 37 and 38, to the upper plates of which the arcuate members 33 and 34 are secured.

The position of the disc 30 with respect to the frames 35, 36, 37, and 38 is thus determined by the relationship of its edge relative to the arcuate members associated with said frames. Since the position of the head units 96 relative to their associated frames is precisely determined after the initial adjustments, subject to controlled indexing steps of the specified distance between tracks by the stepping motors, it may be seen that the positioning of the head units 96 with respect to the storage areas of the disc 30 is governed by the peripheral edge of the disc 30 in cooperation with the arcuate members 31, 32, 33, and 34 on the frames 35, 36, 37, and 38.

Therefore as the disc 30 is caused to rotate by energization of the motor 54, and the head units 96 cooperate with the storage area on the disc 30 for storage or retrieval of information, the exact configuration of the sensing and recording tracks is determined by the configuration of the peripheral edge of the disc 30, so that any minor variations or irregularities from a precise circular pattern are followed by the head units as information is sensed from a previously recorded track, since the disc moves laterally to accommodate these irregularities to exactly the same extent during each rotation.

It will also be appreciated that this enables the same disc 30 to be used in different reading and recording units, since the edge of the disc itself insures that the same track configuration for storage and retrieval of information will be followed in all instances, regardless of whether the disc is always used in the same reading and recording unit or not. Due to the air bearing means between the arcuate members 31, 32, 33, and 34 and the disc 30, there is no wear on the edge of said disc, and it thus serves as an excellent reference surface.

The total amount of information which may be stored on a disc of the type shown in the illustrated embodiment will, of course, vary in accordance with the size of the disc, the number of discs employed, and the requirements of the information-processing system with which the random access storage unit is employed. In a typical application, described herein purely for purposes of example, there are 44,441,600 bits of information stored on each disc. With four separate reading and recording head units, each including eight separate reading and recording head pairs, and capable of indexing a total of thirty-two steps, there are 1,024 separate tracks on each disc. Each track length is thus 43,400 bits. Using a storage density of 2,000 bits per inch, the circumference of the inside track on the disc is 21.2 inches, and its diameter is 6.75 inches. The disc active width is 2.048 inches for the 1,024 tracks, which are spaced on 0.002-inch centers. This requires the disc to have an outside diameter of 10.846 inches. It will, of course, be understood that in an arrangement in which an equal number of bits are stored in each track, the density of 2,000 bits per inch is applicable only to the inside track, and that the tracks successively spaced outwardly from the center of the disc will have successively decreasing storage densities. In the alternative, a uniform storage density could be maintained, in which case the number of bits stored in each track would successively increase from the innermost track to the outermost.

A conventional stepping motor, capable of operating at 160 steps per second under load without hardship, may be used to position the head units. Therefore a positioning time of 200 milliseconds maximum or 100 milliseconds average results with the 32-track assignment for each head unit. The successive access time should be no more than 50 milliseconds, from one track being operated upon to the next. Rotation of the disc at a speed of 1,200 revolutions per minute is sufficient for satisfactory sensing and recording. With this speed, the bit frequency is 868 k.c. for the 43,400 bits per track.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. An information storage device of the random access type comprising, in combination:

an interchangeable information storage disc having a magnetic storage area on one surface thereof;

a plurality of columns for supporting said storage disc for rotational movement, each of said columns having a flat supper surface with an orifice disposed therein through which air under pressure may be forced to provide an air bearing for supporting the storage disc;

a motor for driving the storage disc in rotational movement;

a flexible coupling connecting the motor to the storage disc;

braking means for halting rotational movement of the storage disc when desired;

a plurality of fixed frames, each having an arcuate element secured thereto and cooperating with the periphery of the storage disc to determine the position of the storage disc during rotational movement to enable information to be sensed therefrom as it rotates, and also including at least one orifice in each arcuate element through which air under pressure may be forced to provide an air bearing between the disc and the arcuate element;

a plurality of resiliently mounted frames, each having an arcuate element secured thereto positioned opposite the arcuate element of a fixed frame and cooperating with the periphery of the storage disc to urge said disc into bearing relationship with the arcuate elements of the fixed frames, and also including at least one orifice in each arcuate element through which air under pressure may be forced to provide an air bearing between the disc and the arcuate element;

a reading and recording head unit, having a plurality of pairs of individual reading and recording heads, associated with each of the frames and arranged to cooperate with a given portion of the magnetic storage area of the disc for the storage and retrieval of information;

a plurality of resilient arms on which the reading and recording head units are mounted for yieldably urging said head units into operative relationship with the storage area of the disc, each of said resilient arms being of a different effective length to enable its respective head unit to cooperate with a different portion of the magnetic storage area;

indexing means associated with the resilient arms of each of the head units ot enable said head units to be selectively positioned for reading from and recording on selected portions of the magnetic storage area of the storage disc;

a stepping motor associated with each of the indexing means for causing said head units to be stepped inwardly or outwardly with respect to the center of the disc a precise distance to enable a desired recording track of the magnetic storage area to be sensed or recorded upon; and adjusting means associated with each of the head units to enable a precise setting of the position of the head unit with respect to the disc to be made.

2. An information storage device of the random access type comprising, in combination:

an information storage disc having a magnetic storage area on one surface thereof;

air bearing means for yieldably supporting the storage disc for rotational movement;

means for driving the storage disc in rotational movement;

flexible coupling means for coupling the driving means to the storage disc to enable it to be driven in rotational movement;

braking means for halting rotational movement of the storage disc when desired;

a plurality of fixed positioning members, each including an arcuate surface cooperating with the periphery of the storage disc to determine the position of the storage disc during rotational movement to enable information to be sensed therefrom as it rotates, and also including air bearing means associated with said arcuate surface to provide substantially frictionless bearing between said surface and the periphery of the storage disc;

a plurality of resiliently mounted positioning members, each including an arcuate surface positioned opposite the arcuate surface of a fixed positioning member and cooperating with the periphery of the storage disc to urge said disc into bearing relationship with the arcuate surfaces of the fixed positioning members, and also including air bearing means associated with said arcuate members of the resiliently mounted positioning members to provide substantially frictionless bearing between said surface and the periphery of the storage disc;

a reading and recording head unit associated with each positioning member and arranged to cooperate with a given portion of the magnetic storage area of the disc for the storage and retrieval of information;

flexible mounting means for each of the reading and recording head units for yieldably urging said head units into operative relationship with the storage area of the disc, each of said mounting means being of a different length to enable its respective head unit to cooperate with a different portion of the magnetic storage area;

indexing means associated with the flexible mounting means of each of the head units to enable said head units to be selectively positioned for reading from and recording on selected portions of the magnetic storage area of the storage device; and a stepping motor associated with each of the indexing means for causing said head units to be stepped in or out with respect to the center of the disc a precise distance to enable a desired recording track of the magnetic storage area to be sensed or recorded upon.

3. An information storage device of the random access type comprising, in combination:

an information storage disc;

bearing means for supporting the storage disc for rotational movement;

means for driving the storage disc in rotational movement;

coupling means for coupling the driving means to the storage disc;

a plurality of fixed positioning members, each including an arcuate surface cooperating with the periphery of the storage disc to position it to enable information to be sensed therefrom and recorded thereon as it rotates, each of said arcuate surfaces being provided with bearing means;

a plurality of resiliently mounted positioning members, each including an arcuate surface positioned opposite the arcuate surface of a fixed positioning member and cooperating with the periphery of the storage disc to urge said disc into bearing relationship with the arcuate surface of the fixed positioning members, each of the arcuate surfaces of the resiliently mounted positioning members being provided with bearing means;

a sensing and recording element flexibly mounted on each of the fixed and the resiliently mounted positioning members for sensing information from the storage disc and recording it thereon; and indexing means associated with each of the sensing and recording elements to enable them to be selectively positioned for reading from and recording on certain predetermined areas of the storage disc.

4. The storage device of claim 3 in which the means for resiliently supporting the storage disc for rotational movement include a plurality of air bearings.

5. The storage device of claim 3 in which each of the sensing and recording elements includes a plurality of individual heads for reading and recording with respect to individual tracks on the storage disc.

6. The storage device of claim 3 in which each of the sensing and recording elements is positionable over a different area of the storage disc.

7. The storage device of claim 3 in which indexing of each of the sensing and recording elements is accomplished by means of a stepping motor.

8. The storage device of claim 7, also including adjusting means for rotationally adjusting the position of the stepping motor to provide a linear adjustment of the corresponding sensing and recording element.

9. The storage device of claim 3 in which the bearing means associated with the arcuate surfaces of the fixed and the resiliently mounted positioning member are air bearing means.

10. The storage device of claim 3 in which each of the sensing and recording elements is pivotally mounted on a resilient support which urges it into a position of close proximity to the disc, from which it is separated by air flow generated by rotation of the disc.

11. The storage device of claim 3 in which braking means are provided to halt rotation of the disc.

12. The storage device of claim 3 in which retaining means are provided to maintain the storage disc in proper position with respect to the bearing means and the sensing and recording elements during rotation of the disc.

13. The storage device of claim 12 in which the said retaining means comprises a disc of suitable weight resting atop the storage disc.

14. The storage device of claim 3 in which adjusting means are associated with each of the head units to enable a precise setting of the position of the head unit with respect to the disc to be made.

15. The storage device of claim 14 in which said adjusting means includes a member having threaded portions of different pitches thereon which cooperate with threaded bores in two positioning elements so that rotation of said member moves one of said positioning elements with respect to the other a distance related to the difference in the pitches of the two oppositely threaded portions of said threaded member.

16. An information storage device of the random access type comprising, in combination:

an information storage disc;

means for supporting the storage disc for rotational movement;

means for driving the storage disc in rotational movement;

fixed positioning means each including at least one arcuate surface cooperating with the periphery of the storage disc to position it to enable information to be sensed therefrom as it rotates, and including bearing means operable in association with the periphery of the storage disc;

resiliently mounted positioning means including at least one arcuate surface positioned opposite the arcuate surface of the fixed positioning means and cooperating with the periphery of the storage disc for urging said disc against the arcuate surface of the fixed positioning means; and sensing means mounted on at least one of said positioning means and capable of sensing information from the storage disc.

17. An information storage device of the random access type comprising, in combination:

an information storage disc;

means for supporting the storage disc for rotational movement;

means for driving the storage disc in rotational movement;

a plurality of opposed positioning means, each including at least one arcuate surface cooperating with the periphery of the storage disc to position it to enable information to be sensed therefrom as it rotates, and including bearing means operable in association with the periphery of the storage disc; and sensing means mounted on at least one of said positioning means and capable of sensing information from the storage disc.

References Cited

UNITED STATES PATENTS

| | | | |
|---|---|---|---|
| 3,080,552 | 3/1963 | Stemme et al. | 340—174.1 |
| 3,177,495 | 4/1965 | Felts | 346—74 |
| 3,187,112 | 6/1965 | Smith | 179—100.2 |
| 3,187,315 | 6/1965 | Cheney | 340—174.1 |
| 3,298,008 | 1/1967 | Smith et al. | 340—174.1 |

OTHER REFERENCES

Khoury, H. A.: Disc Air Bearing. IBM Technical Disclosure Bulletin, vol. 4 (No. 5), p. 78, October 1961.

BERNARD KONICK, Primary Examiner

J. ROSENBLATT, Assistant Examiner

U.S. Cl. X.R.

274—39; 308—9; 346—74